United States Patent [19]

Tominaga et al.

[11] Patent Number: 5,309,431
[45] Date of Patent: May 3, 1994

[54] ROUTE REGULATING APPARATUS

[75] Inventors: Susumu Tominaga, Yokohama; Satoshi Nojima, Tokyo, both of Japan

[73] Assignee: Fujitsu Limited, Kawasaki, Japan

[21] Appl. No.: 671,959

[22] Filed: Mar. 19, 1991

[30] Foreign Application Priority Data

Mar. 19, 1990 [JP] Japan .................................. 2-066838
Mar. 20, 1990 [JP] Japan .................................. 2-068150

[51] Int. Cl.⁵ .......................................... H04L 12/56
[52] U.S. Cl. ..................................... 370/60; 370/94.1
[58] Field of Search ................. 370/94.1, 60, 61, 62, 370/16, 85.6, 17, 60.1, 94.2, 8.1, 8.2, 11.1, 11.2; 340/827, 825.02, 825.51, 825.5

[56] References Cited

U.S. PATENT DOCUMENTS

| 4,887,259 | 12/1989 | Morita | 370/60 |
| 4,942,569 | 7/1990 | Maeno | 370/60 |
| 4,993,024 | 2/1991 | Quinquis et al. | 370/84 |
| 5,014,265 | 5/1991 | Hahne et al. | 370/61 |
| 5,042,029 | 8/1991 | Hayakawa | 370/60 |
| 5,107,493 | 4/1992 | Eng et al. | 370/60 |
| 5,119,372 | 6/1992 | Verbeek | 370/60 |

OTHER PUBLICATIONS

D. W. Glazer et al., "On Congestion Based Dynamic Routing," *International Conference on Communications*, vol. 2, Jun. 1987, pp. 974–979.
R. Jain et al., "Congestion Avoidance in Computer Networks with a Connectionless Network Layer: Concepts, Goals, and Methodology,", *Computer Networking Symposium*, Apr. 1988, pp. 134–143.
P. Joos et al., "A Statistical Bandwidth Allocation And Usage Monitoring Algorithm For ATM Networks," *IEEE International Conference on Communications*, vol. 1, Jun. 1989, pp. 415–422.
D. Chiu et al., "Analysis of the Increase and Decrease Algorithms for Congestion Avoidance in Computer Networks", *Computer Networks and ISDN Systems*, vol. 17, No. 1, Jun. 1989, pp. 1–14.

Primary Examiner—Douglas W. Olms
Assistant Examiner—Dang Ton
Attorney, Agent, or Firm—Staas & Halsey

[57] ABSTRACT

In a network, a route which can be uniquely identified is constructed by selecting an arbitrary packet-switching node and an arbitrary transmission line in an arbitrary order from the network. A route memory unit stores data indicating which route is involved in which transmission line within the network. A congested state detecting unit detects a congested state of a transmission line accommodated within its own node. The detected congested state is transmitted to another node by a congested state informing unit as congested state information. A route identifying unit receives the congested state information from the other node and retrieves a route within a corresponding transmission line from the route memory unit to thereby identify the route accommodated within its node. A route control unit carries out control of the congested state of the identified route on the basis of the received congested state information. As described above, since traffic passing the transmission line is classified into "route" and grouped, an object whose congestion is to be supervised is limited and each node can regulated only the traffic passing the transmission line in which the congestion occurred in units of routes.

11 Claims, 13 Drawing Sheets

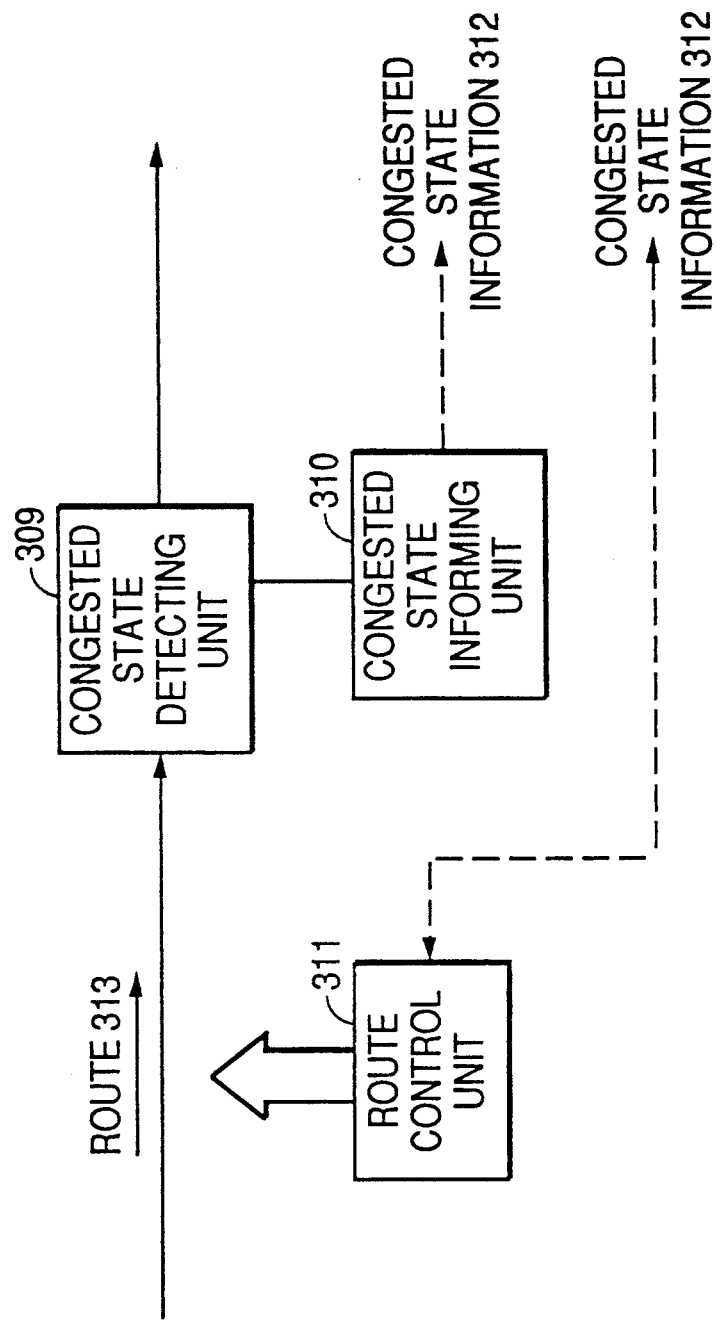

| ROUTE 1 | 0 | (PASS) |
|---|---|---|
| ROUTE 2 | 0 | (PASS) |
| ROUTE 3 | 1 | (REGULATION) |

TRANSMISSION LINE 403AB

| ROUTE 2 | 0 | (PASS) |
|---|---|---|
| ROUTE 3 | 1 | ((REGULATION)) |
| ROUTE 4 | 1 | (REGULATION) |

TRANSMISSION LINE 403BC

FIG. 10
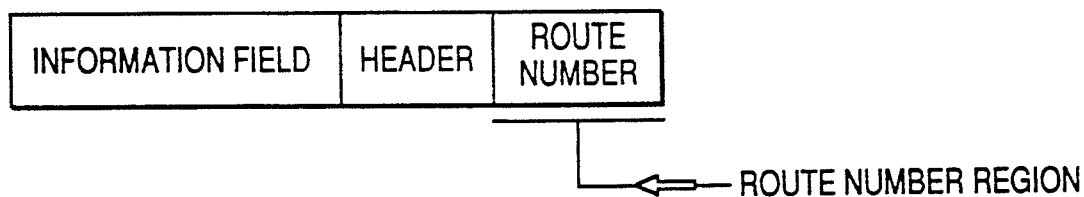
FIG. 13A
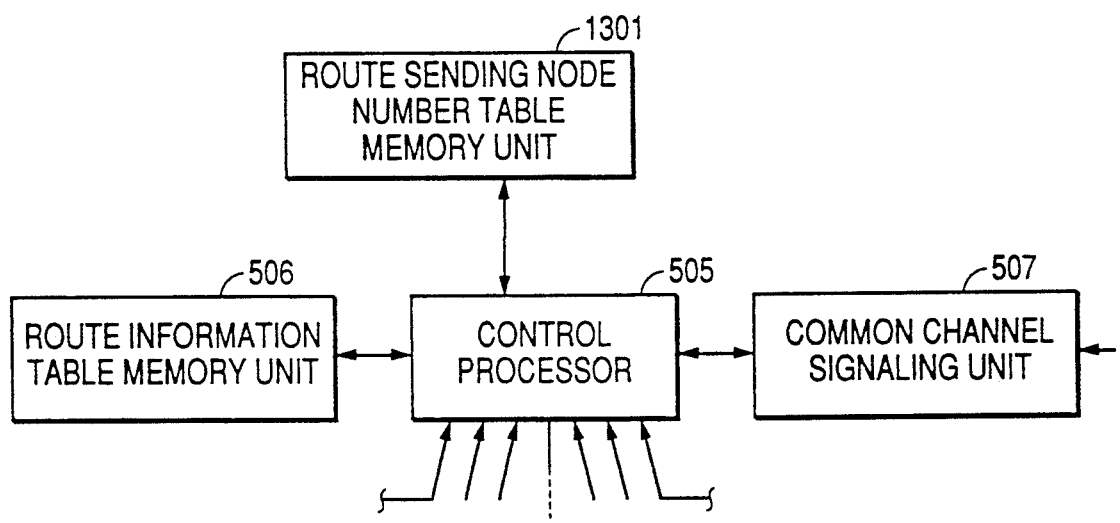
FIG. 13B 402, 402' : PACKET SWITCHING NODES
403, 403' : TRANSMISSION LINES
404 : TERMINALS

ROUTE REGULATING APPARATUS

BACKGROUND OF THE INVENTION

1. Field of the Invention

The present invention generally relates to a packet communication network composed of transmission lines for connecting a plurality of terminals accomodated in a packet -switching node and transmission lines for connecting a plurality of packet-switching nodes and, more particularly, to a packet transfer regulating apparatus for alleviating congested states of packet-switching nodes and transmission lines.

2. Description of the Related Art

A packet communication network is comprised of transmission lines for connecting terminals accomodated in a packet -switching node and transmission lines for connecting packet-switching nodes with each other. The terminal is a source for generating a wide variety of information such as data, image data, audio data and so on. The packet-switching node is adapted to extract priority information contained in a packet from a terminal and to add a new transfer destination address to the header of the priority information to form a packet format or to judge a route to which data is transferred.

In a packet communication network, the packet-switching node extracts from a probability standpoint communication information generated by the terminal and converts it to packet data to effect the communication. Thus, highly efficient resource administration is realized on the basis of large grouping effect within the network. Respective packets are temporarily stored in a transfer queuing buffer provided within the node, thereby keeping constant the band width of the transmission line.

However, when a synchronization communication or the like whose real time property is required is performed by using packet data, information generated from the terminals is irregular. Thus, if respective data are multiplexed on the line, there is a low probability that packet data will be concentrated on the packet-switching node. As a consequence, packets cannot be transferred within the node, and delay in transmission of a communication packet within the node is increased. Then, if the number of packets (stored packets) accumulated in the transfer queuing buffer exceeds an allowable limit, the packet-switching node or the transmission line is placed in a congested state, and packets are discarded in the packet-switching node or in the transmission line. Thus, there arises the problem that packet communication quality is deteriorated.

Such a congested state may occur in the transmission line or in the packet-switching node. When a congested state occurs, a control operation is performed so that the flow of packets to the congestion occurrence point is regulated (stopped) and the flow of packets is regulated so that it becomes less than the flow of packets out of the congestion occurrence point. Thus, excess packets are directed to another switching-node. This control operation is what might be called a transfer regulation. The following two points are considered as points at which the transfer regulation is executed:

(1) An output point of a packet-switching node in which traffic can be flowed to the congestion occurrence point through the transmission line; and (2) A traffic input point in which traffic is flowed to a network (packet communication network).

Ideally, the input point at which excess traffic, which causes congestion, is input to the network is detected at the congestion occurrence point. The input is then regulated at that input point without delay (zero time). However, a regulation instruction is transmitted to the input point with a constant delay time. Thus, it is impossible to regulate traffic flowing during that period of time. This means that the system for directly regulating the input point cannot be realized in a large-scaled network.

Concentration of traffic is not limited to the excess input of one input (traffic), but may occur when several inputs are accidentally overlapped. When this occurs, the overlapped state may cease to exist automatically after a certain excessive state. Accordingly, the system for regulating traffic flowing to the input point of the network is not always optimum.

When the concentration of traffic occurs in a wave-like fashion, the following transfer regulating system is proposed. Regulation at the point indicated by (2) above is mainly performed and, as indicated by (1) above, the output point of the packet-switching node immediately before the congestion occurrence point is regulated and such regulation is sequentially extended to nodes of preceding stages.

The following three conditions are indispensable to such a transfer regulation system:

(a) [short regulation achieving time]

With ideal transfer control, regulation reaches the input point with a physical transmission time ranging from the congestion occurrence point to the input point in which the traffic is input to the network. In practice, however, the regulation achieving period is affected by the amount of excess traffic flowing into the network. This increase brings about an increase in the delay time of other communication and an increased buffer amount at the congestion occurrence point. Therefore, the regulation achieving time must be minimized.

(b) [minimum regulation extending or covering range]

A system for regulating only a communication (traffic) which causes congestion is ideal because invalid and excessive regulation occurs when it is extended to communications other than that which passes through the congested transmission line.

(c) [appropriate hardware amount]

The amount of hardware must be kept within practical limits.

There are two systems based on conventional techniques.

The first is a direct regulation system. In this system, an input source in which an excessive flow occurs at a congestion occurrence point is specified and a regulation instruction is issued directly to the input source, and in this system, a regulation achieving time and a regulation extending range are both approximately ideal.

The second system is a transmission line regulation system. In this system, an input transmission line is regulated from a congestion occurrence point in the upstream direction (input direction), whereby a quasi-congestion occurs in the preceding node or transmission line, and regulation is sequentially extended in the upstream direction to the traffic input point.

The first example of the aforementioned prior art is described with reference to FIG. 1.

Let us consider a packet communication network composed of packet-switching nodes $101_1$ to $101_7$ for transferring communications #1 to #6 and transmission lines $102_1$ to $102_6$ for connecting packet-switching nodes $101_1$ to $101_7$ or the like as shown in FIG. 1. Let us assume that packet-switching node $101_3$ detects congestion in transmission line $102_3$ (shown by the hatched area in FIG. 1). Node $101_3$ detects all communications (communications #1 to #3 in FIG. 1) which pass through transmission line $102_3$ or recognizes them beforehand, and must transmit regulation information including the types of communications to packet-switching nodes $101_1$, $101_5$ and $101_7$, which are the sending or source nodes. In this system, however, to specify the input source, the flow of respective communications through respective transmission lines must be watched constantly. Further, to discriminate communications passing through respective transmission lines, call identifying numbers such as the logical channel numbers of individual packets must be detected, and sending nodes of such calls must be detected. As described above, the first example of the prior art has the substantial problem that an enormous hardware and a complicated processing are needed. Thus, this conventional system cannot cope with a future enlarged network.

The second example of the prior art is fundamentally a system for regulating traffic from a transmission line which becomes an input to a transmission line when a congestion occurs in a certain transmission line. This system is described with reference to the packet communication network of FIG. 2, which is similar to that of FIG. 1. If a congestion occurs in transmission line $102_3$ accommodated in a certain packet-switching node $101_3$, the regulation will be propagated first to transmission line $102_3$; then to transmission lines $102_2$, $102_5$, and $102_6$; and finally to transmission lines $102_1$, and $102_4$. In other words, although it is originally requested that only communications #1 to #3 be regulated, the regulation is also propagated to communications #4 to #6, thus lowering the throughput of the entire circuit. As described above, the second example of the prior art has the substantial disadvantage that congestion in the entire circuit cannot be alleviated. Furthermore, traffics are stored in the respective stages so that, in addition to the transmitting time, a time in which buffers of respective stages consume is needed also as the regulation achieving time.

SUMMARY OF THE INVENTION

In view of the above background, an object of the present invention is to provide an apparatus for regulating each route in which only a route passing a transmission line in which a congestion occurs can be regulated by a simple control processing and the route can be readily restored from the congestion state.

The present invention is based upon a packet communication network comprising transmission lines for connecting a plurality of terminals and accomodated in a packet-switching node and transmission lines for connecting packet-switching nodes with each other.

In the present invention, an arbitrary packet-switching node existing within such a network and arbitrary transmission line are selected in an arbitrary order, thereby defining a route which can be uniquely discriminated.

Each packet-switching node contains units for controlling the congested state of each route while administering a route accommodated within its own packet-switching node.

These units are composed of a route memory unit, a congested state detecting unit, a congested state informing unit, a route identifying unit and a route control unit. They are described below.

The route memory unit memorizes which route of respective routes is involved or used in each transmission line within the packet communication network.

The congested state detecting unit detects the congested state of a transmission line accommodated in its own packet-switching node or of a route, for example, a so-called congestion state.

The congested state informing unit transmits the transmission line or route congested state detected by the congested state detecting unit to other packet-switching nodes. Alternatively, a variant is also possible in which the congested state informing unit memorizes identifying information of a sending node of a route at every route involved in each transmission line. This congested state informing unit transmits a congested state of each transmission line or route only to the corresponding sending node.

The route identifying unit is provided when the congested state detecting unit detects a congested state of a transmission line. The route identifying unit receives congested state information from other packet-switching nodes, retrieves a route involved in a transmission line corresponding to the received information and identifies a route accommodated by its own packet-switching node from the retrieved route.

The route control unit controls the congested state of the route identified by the route identifying unit or directly transmitted as the congested state information on the bases of the received congested state information. This control operation is realized by regulating the transmission of packet data transferred in the identified route or by cancelling the regulation. Alternatively, such control operation is realized as an operation in which a terminal using the route is identified and an input of packet data transmitted by the identified terminal is regulated or the regulation is cancelled.

In the present invention, traffic passing the transmission line is classified into the aforementioned "route" and grouped, whereby an object whose congestion is to be supervised is limited to far fewer routes than in the prior art in which several hundreds to several thousands of congested communications should be separately supervised. Then, while administering the route of its own packet-switching node, each packet-switching node controls the congested states of the respective routes to thereby regulate only the traffic passing through transmission line in which congestion occurs in units of route. Therefore, the route can be regulated very efficiently by a simple control operation.

In this case, packet data in the other routes than the particular route are not regulated and transmitted in a normal manner. Therefore, a busy state, such as a congested state is prevented from extending to the other routes.

BRIEF DESCRIPTION OF THE DRAWINGS

A better understanding of the objects, features and advantages of the invention can be gained from a consideration of the following detailed description of the preferred embodiments, in conjunction with the accompanying drawings, wherein:

FIGS. 3A and 3B are block diagrams, for explaining principles of the present invention;

FIG. 10 is a diagram showing a packet format used in the present invention;

FIGS. 13A and 13B are schematic diagrams used to explain a third embodiment of the present invention.

DESCRIPTION OF THE PREFERRED EMBODIMENTS

The principle of the present invention will be described initially. The present invention is based on a packet communication network composed of transmission lines for connecting a plurality of terminals accommodated in a packet-switching node and transmission lines for connecting packet-switching nodes with each other.

In the present invention, a uniquely identifiable route is defined. This route is constructed by selecting an arbitrary packet existing within the network and an arbitrary transmission line in an arbitrary order. The present invention is characterized in that, while administering a route accommodated by its own packet-switching node, each packet-switching node controls the congested state of each route.

Figure 3A:
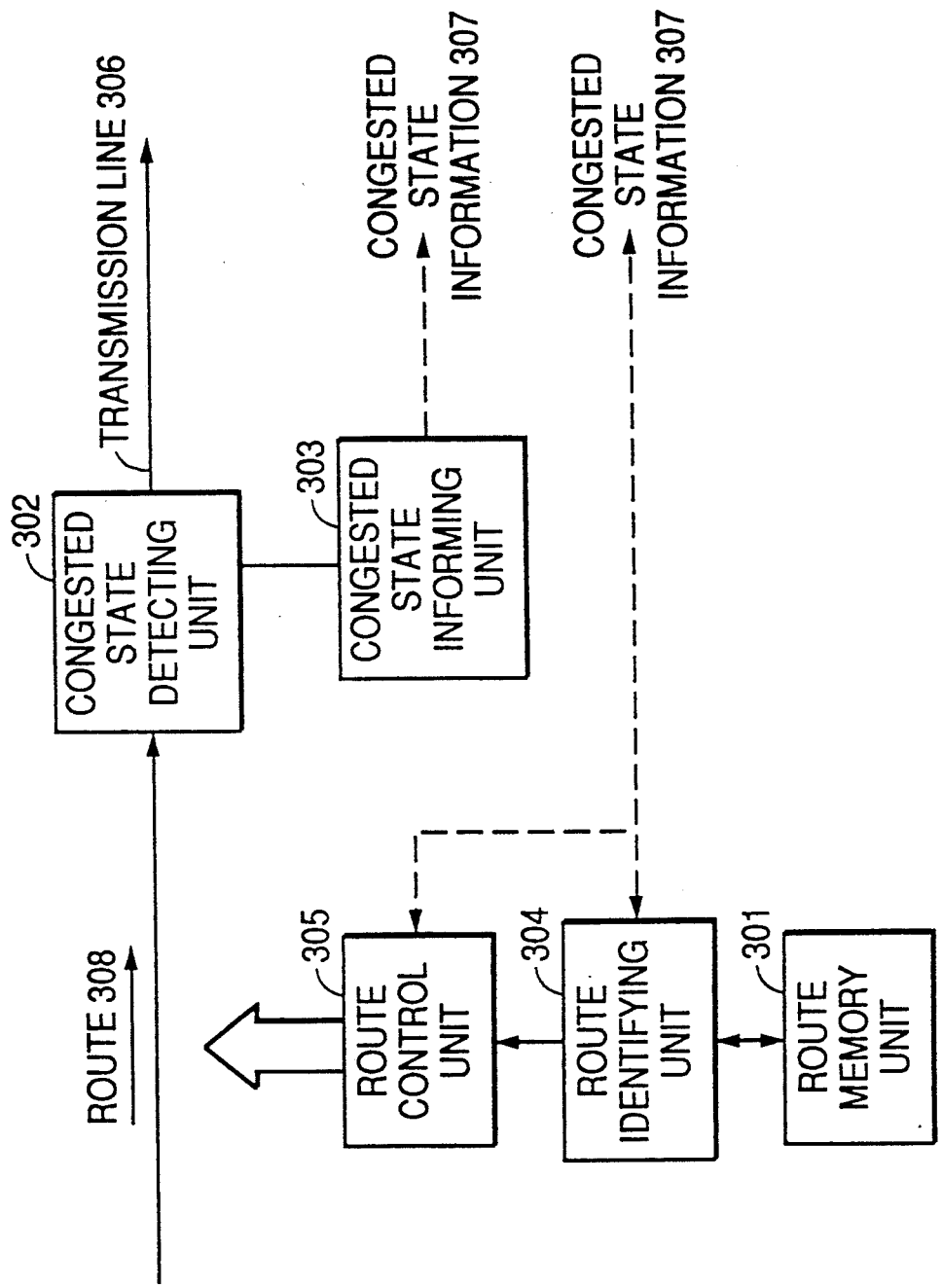

FIGS. 3A and 3B are block diagrams showing the principles of the present invention.

FIG. 3A is a principle block diagram of components of the present invention constructed in each packet-switching node in the first mode of the present invention.

As shown in FIG. 3A, a route memory unit 301 memorizes which of the routes within the defined network is involved in every transmission line 306 within the packet communication network.

A congested state detecting unit 302 detects a congested state of a transmission line 306 accommodated within its own packet-switching node. This detecting unit 302 detects either an occurrence of a congested state of the transmission line 306 accommodated within its own packet-switching node or a cancellation of a congestion state. Incidentally, the detecting unit 302 may be arranged so as to detect an intermediate congested state.

A congested state informing unit 303 informs other packet-switching nodes of the congested state of transmission line 306 detected by the congested state detecting unit 302 as congested state information 307. The congested state information 307 is either the congested state occurrence information which indicates the occurrence of a congested state in transmission line 306 detected by the congested state detecting unit 302 or congested state cancellation information which indicates that the congested state occurring in the transmission line 306 accommodated within its own packet-switching node is cancelled. Incidentally, the present invention may be modified such that the congested state informing unit 303 can transmit the intermediate congested state to other packet-switching nodes.

A route identifying unit 304 receives congested state information 307 from other packet-switching nodes and retrieves the route involved in the transmission line corresponding to the congested state information from the route memory unit 301 to thereby identify a route 308 accommodate by its own packet-switching node from the retrieved routes.

A route control unit 305 performs the control of the congested state of route 308 identified by the route identifying unit 304 on the basis of the aforementioned congested state information 307 thus received.

FIG. 3B is a principle block diagram of constituents of the second mode of the present invention constructed in each packet-switching node.

As shown in FIG. 3B, a congested state detecting unit 309 directly detects the congested state of a route 313 (not the transmission line) accommodated within its own packet-switching node. The congested state detecting unit 309 may be composed of a flow supervisory unit which supervises the flow of packet data in route 313 accommodated within its own packet-switching node and a detecting unit which detects the congested state of the route by comparing the flow supervised by the supervisory unit with traffic amount set when the call in route 313 is set. Then, the congested state detecting unit 309 detects either the occurrence of a congested state of route 309 or the cancellation of a congested state. Alternatively, the present invention may be modified so as to detect an intermediate congested state.

A congested state informing unit 310 informs other packet-switching nodes of the congested state of route 313 detected by the congested state detecting unit 309 as congested state information 312. In that event, the congested state information 312 might be either congested state occurrence information indicating that a congested state occurs, for example, in route 313 or congested state cancellation information indicating that a congested state occurring in route 313 is cancelled. Alternatively, the congested state informing unit 310 may be modified so as to transmit the intermediate congested state to another packet-switching node.

A route control unit 311 receives congested state information 312 from other packet-switching nodes and controls the congested state of route 313 accommodated within its own packet-switching node in routes corresponding to the congested state information.

The first and second mode of the present invention may be arranged such that route control unit 305 or 311 determines whether or not the terminal utilizing route 308 or 313, whose congested state is to be controlled, is accommodated within its own packet-switching node. If it is, the input of packet data transmitted by the terminal is regulated or the regulation of the input of packet data is cancelled.

The first and second mode of the present invention may include a sending packet-switching node memory unit for each route, as described below. This memory unit memorizes a sending packet-switching node, which is a starting point of each route, at every route 308 or 313 accommodated within its own packet-switching node. Then, the congested state informing unit 303 or 310 retrieves a sending packet-switching node corresponding to route 308 accommodated within transmission line 306 detected by congested state detecting unit 302, or corresponding to route 313 detected by congested state detecting unit 309, from the sending packet-switching node memory unit for each route, and transmits the congested state information 307 or 312 to the retrieved sending packet-switching node.

The operation of the present invention is described hereinafter.

In the present invention, traffic passing the transmission line is classified into the aforementioned "routes" and grouped, whereby objects whose congestion is to be supervised can be reduced to far fewer routes than in the prior art, in which congestion states of several hundreds to several thousands of communications should be supervised separately. Then, while administering the route accommodated by its own packet-switching node, each packet-switching node can regulate only the traffic passing the congested transmission line in units of route by controlling the congested states of respective routes. Thus, the route can be regulated very efficiently.

In the first mode of the present invention, when a congestion (congestion is an example of a congested state), for example, occurs in a certain packet-switching node or in the transmission line accommodated within such packet-switching node, information indicating the occurrence of such a congestion is transmitted to other packet-switching nodes as congested state information. The information of this case is transmitted in the form of, for example, a transmission line number and a flag indicating the occurrence of the congestion state.

In other packet-switching nodes to which this information is transmitted, as shown in FIG. 3A, the route identifying unit 304 retrieves the route included in the transmission line corresponding to the congested state information 307 and identifies route 308 accommodated within its own packet-switching node of the thus retrieved nodes. Then, the route control unit 305 executes the congested state control only to the thus identified route 308 on the basis of the congested state information 307.

Consequently, only packet data of the route included in the transmission line in which the congestion occurrs can be readily regulated and a congested state such as a congestion can be readily cancelled.

Then, packet data of routes other than the corresponding route are not regulated and transferred in an ordinary fashion so that propagation of a congested state such as a congestion to other packet-switching nodes can be minimized.

According to the first mode of the present invention, each packet-switching node need not grasp the status of all communication concerning each packet-switching node, but must grasp only the state of the transmission line accommodated within its own packet-switching node by the congested state informing unit 310 corresponding to that transmission line, thereby effecting a very efficient supervision.

Further, in the first embodiment of the present invention, since the route memory unit is provided, the congested state can be informed only by the information of the transmission line, thereby efficiently transmitting the congested state information 307 to other packet-switching node.

In accordance with the second mode of the present invention, the detection of the congested state is directly performed by the congested state detecting unit 309 not in units of transmission line but in units of route unit as shown in FIG. 3B, and the congested state information 312 is transmitted by the congested state informing unit 310 in units of route.

Therefore, the amount of information in the congested state information processing is greater than in the first embodiment of the present invention in which the information of the transmission line is transmitted. However, the number of routes is much smaller than the number of individual communications, making it possible to considerably reduce the amount of information compared with the examples of the prior art.

Further, in the packet-switching node which receives congested state information, processing to identify the route from the information of the transmission line, such as when the route memory unit 301 shown in FIG. 3A is looked up so that the route regulating control operation can be further simplified, is not needed.

Both in the first and second modes of the present invention, respective packet-switching nodes independently perform parallel regulating operations, enabling regulation to be readily executed.

On the other hand, according to the present invention, particularly in the arrangement of the first or second mode (see FIGS. 3A and 3B), route control unit 305 or 311 determines whether or not the terminal utilizing route 308 or 313, whose congested state is to be controlled, is accommodated within its own packet-switching node. If the terminal is accommodated within its own packet-switching node, the input regulation of the packet data transmitted from that terminal is performed or the input regulation is cancelled, whereby the input regulation can be directly and effectively executed on the terminals participating in the communications performed via the congested transmission line.

Therefore, as described before, since a sending packet-switching node memory unit for each route is provided, congested state information 307 or 312 can be directly transmitted to the sending packet-switching node corresponding to route 313 detected by the congested state detecting unit 309 or route 308 accommodated within the transmission line. Consequently, the congested state information can be readily propagated only to the sending packet-switching node of the corresponding route, whereby redundant information can be prevented from being transferred to other nodes. Therefore, the congested state information can be transmitted efficiently and the congestion can be readily cancelled.

While the first and second modes are described as independent arrangements, if the respective arrangements are properly combined in response to the circumstances of the network, it is possible to realize optimum congested state control. Preferred Embodiments The preferred embodiments of the present invention are described hereinafter.

The first embodiment is described first. This embodiment relates to a kind of transmission line regulation system which regulates only a necessary "route" (referred to later) involved in the input transmission line for the node in the upstream of the congestion occurrence point.

Figure 4:
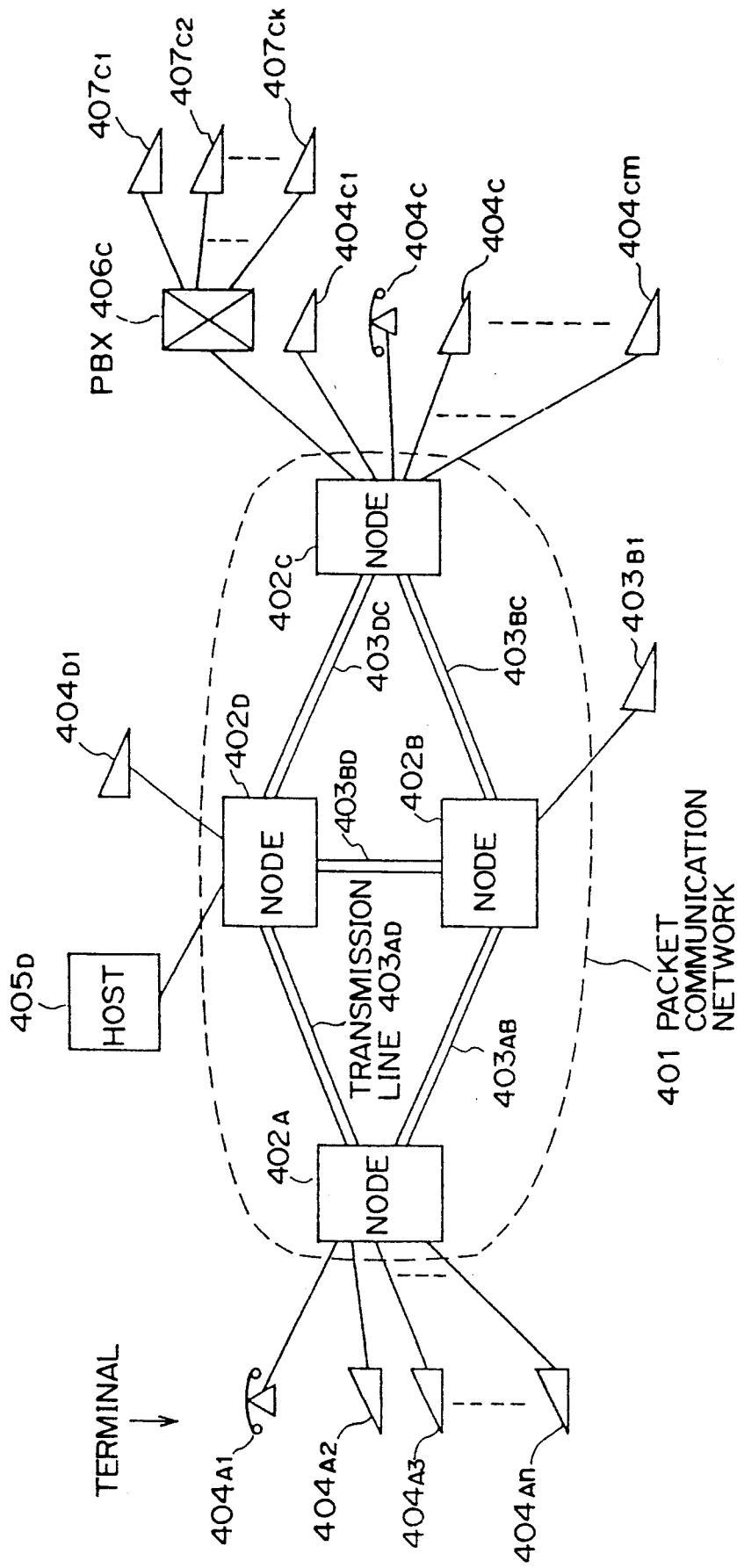
FIG. 4 is a schematic diagram showing an overall arrangement of a packet communication network.

FIG. 4 shows the entire arrangement of a packet communication network. In the embodiment of FIG. 4, a packet communication network 401 has a circuit configuration such that packet-switching nodes (hereinafter simply referred to as nodes) $402_A$, $402_B$, $402_C$ and $402_D$ are mutually connected by transmission lines $403_{AB}$, $403_{AD}$, $403_{BC}$, $403_{BD}$, $403_{DC}$. Node $402_A$, for example, accommodates a plurality of terminals $404_{A1}$ to $404_{An}$. Similarly, node $402_B$ accommodates a terminal $404_{B1}$ and node $402_C$ accomodates, for example, a plurality of terminals $404_{C1}$ to $404_{Cm}$ and a private branch exchange $PBX406_C$ which accommodates internal terminals $407_{C1}$ to $407_{CK}$. Further, the node $402_D$ accommodates, for example, a terminal $404_{D1}$ and a host computer $405_D$. The network configuration of FIG. 4 is described by way of example, and a network configuration of a larger network scale can be constructed in practice.

Figure 5:
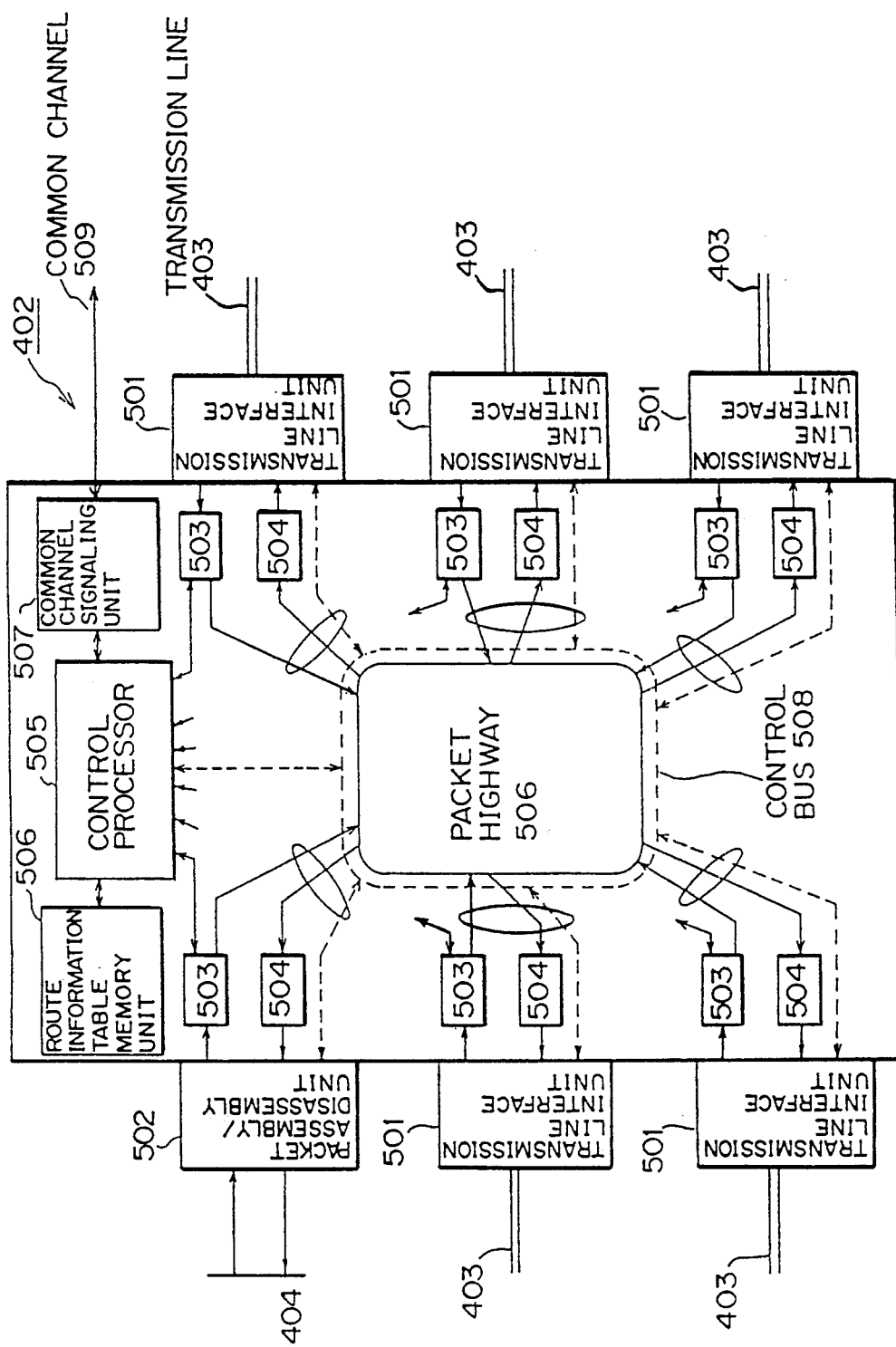
FIG. 5 is a block diagram of a packet-switching node to which the first or second embodiment of the present invention is applied.

FIG. 5 is a diagram showing in block form nodes $402_A$, $402_B$, $402_C$ and $402_D$ according to the first embodiment of the present invention. Incidentally, the second embodiment of the present invention, which will be referred to later, has a similar arrangement. In the following description, node $402_A$ and so on will be simply referred to as node 402, transmission line $403_{AB}$ and so on will be simply referred to as transmission line 403, and the terminal $404_{A1}$ and so on will be simply referred to as terminal 404.

As shown in FIG. 5, terminal 404 is accommodated by a packet assembly/disassembly unit 502, and transmission line 403 is accommodated by a transmission line interface unit 501. Packet data received at the packet assembly/disassembly unit 502 or at the transmission line interface unit 501 is converted into packet data of a common protocol, independent of communication media and is input to a transfer destination judging unit 503. The judging unit 503 judges address information added to a packet header, adds new address information to the packet data and transmits the resultant packet data to a packet highway 506. A distribution unit 504 selects communication data on the packet highway 506 and transmits the selected communication data to the transmission line interface unit 501.

A control processor 505 performs control such as call control and network supervision by controlling the transfer destination judging unit 503. Further, the control processor 505 judges a pass line of regulation information, described later, with reference to the route information table TBL1 stored in the route information table memory unit 506. Then, a variety of control data are exchanged between the transmission line accommodating unit 501 and the packet assembly/disassembly unit 502 via a control bus 508. Further, control data are exchanged between the node 402 and other node via a common channel 509 from a common channel signaling unit 507.

Figure 6:
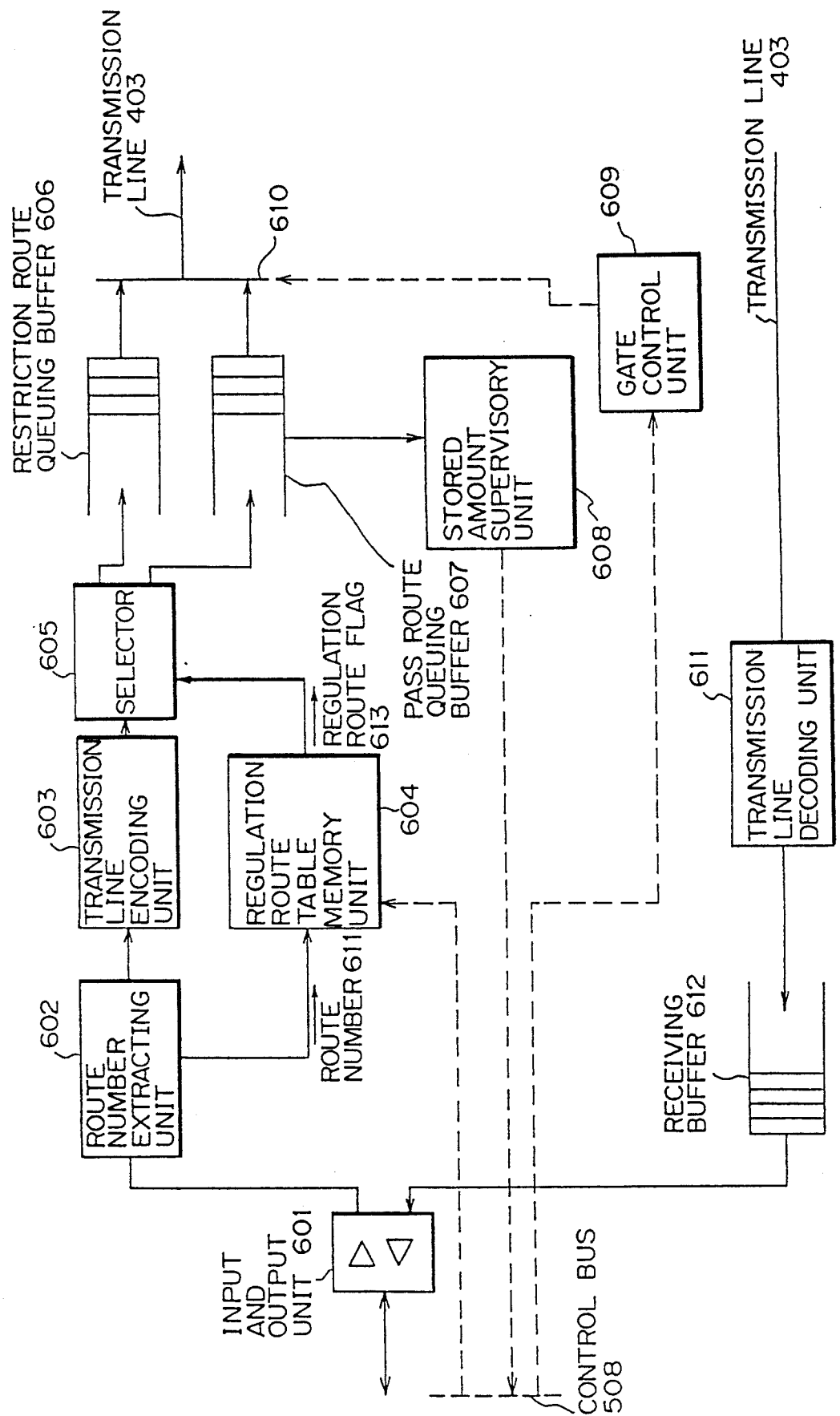
FIG. 6 is a schematic block diagram of a transmission line interface unit to which the first embodiment of the present invention is applied.

FIG. 6 is a schematic diagram showing in block from the transmission line accommodating unit 501 of FIG. 5, according to the first embodiment of the present invention.

As shown in FIG. 6, packet data are input to an input and output unit 601 from the packet highway 506 through the distribution unit 504 of FIG. 5, and fed to a route number extracting unit 602, in which a route number 611 of the "route" (described later) through which the packet data is transmitted, and extracted from the input packet data. Thereafter, the packet data are converted into a protocol suitable for the kinds of communication media by a transmission line encoding unit 603.

A regulation route table memory unit 604 stores a regulation route table TBL2, described later. The contents of this table TBL2 are set by the control processor 505 of FIG. 5 through the control bus 508. The table TBL2 is accessed by the address of the route number 611 extracted by the route number extracting unit 602, whereby a regulation route flag 613 is output to a selector 605 from the regulation route table memory unit 604. The selector 605 selectively connects the packet data converted by the transmission line encoding unit 603 to a pass route queue provided within a pass route queuing buffer 607 or to a regulation route queue provided within a regulation route queuing buffer 606 on the basis of the regulation route flag 612.

A gate control unit 609 usually allows a gate 610 to select the output of the pass route queuing buffer 607, whereby packet data connected to the pass route queue of the buffer 607 are sequentially transmitted to the transmission line 403 through the gate 610.

Further, when the gate control unit 609 receives congestion cancel information from the control processor 505 of FIG. 5 through the control bus 508, the gate control unit 609 allows the gate 610 to select the output of the restriction route queuing buffer 606 to thereby output the packet data connected to the regulation route queue of the buffer 606 to the transmission line 403. Thereafter, the gate control unit 609 again allows the gate 610 to select the output of the pass route queuing buffer 607.

A stored amount supervisory unit 608 supervises the number of packet data stored in the pass route queuing buffer 607 and detects a congested state when the number of the packet data exceeds a predetermined value. When the stored amount supervisory unit 608 detects the congested state, the stored amount supervisory unit 608 transmits information to the control processor 505 through the control bus 508.

The packet data from the transmission line 403 is input in a transmission line decoding unit 611, in which it is decoded and converted into packet data of a common protocol which is independent of the kinds of communication media. Then, the packet data is connected to the receiving queue of a receiving buffer 612 and transmitted to the transfer destination judging unit 503 of FIG. 5 via the input and output unit 601.

Figures 7, 8A, 8B:
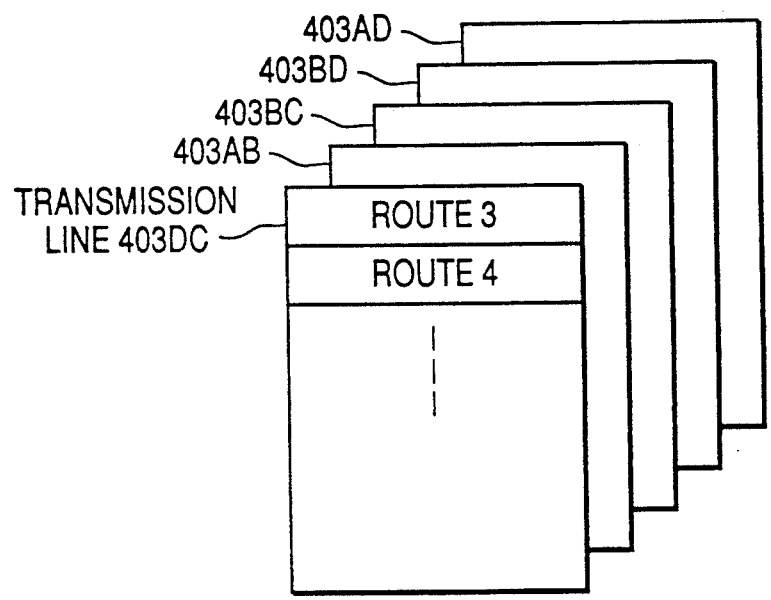
FIG. 7 is a schematic representation of a route information table TBL1.
FIGS. 8A and 8B are schematic representations of a regulation route table TBL2.

FIG. 7 is a schematic diagram showing a data format of the route information table TBL1 stored in the route information table memory unit 506 of FIG. 5. In this embodiment, in the packet communication network 401 of FIG. 4, "routes" are defined by sequentially selecting arbitrary nodes and arbitrary transmission lines existing within the network in an arbitrary order and proper route numbers are assigned to respective routes. For example, a route formed of "node $402_A$, node $402_B$ and node $402_D$" in that order is endowed with route 1 and a route formed of "node $402_A$, node $402_B$ and node $402_C$" is endowed with route 2. In that case, different route numbers are allocated to a route formed of "node $402_A$, node $402_B$ and $402_D$" and a route formed of "node $402_A$, node $402_B$, node $402_C$ and node $402_D$" of, for example, FIG. 4. Then, information indicating which routes of what route numbers are involved in the respective transmission lines $403_{AB}$, $403_{AD}$, $403_{BC}$, $403_{BD}$, $403_{DC}$ and so on are extracted. Information extracted from the entire packet communication network of FIG. 4 as described above, such as of the respective nodes $402_A$, $402_B$, $402_C$ and $402_D$ as the common route information table TBL1, are stored in the route information table memory unit 506 (FIG. 5). This storing operation is performed upon initializing the circuit or setting each route.

FIGS. 8A and 8B are schematic representations of the data format of the regulation route table TBL2 stored in the regulation route table memory unit 604 (FIG. 6) provided within each transmission line interface unit 501 (FIG. 5) contained in each node 402 (FIG. 4). In the table TBL2, flag "1" or "0" is used to determine whether or not the output of the packet data transmitted through the route is regulated at every route number of the routes involved in the transmission line 403 accommodated by each transmission line interface unit 501. The designated content is set by the control processor 505 of FIG. 5 through the control bus 508, as described earlier. For example, FIG. 8A illustrates an example of the contents of the regulation route table TBL2 stored in the regulation route table memory unit 604 within the transmission line interface unit 501, which accommodates the transmission line $403_{AB}$ connected to the node $402_A$ and illustrates the present state such that "pass" is instructed to route 1 and route 2 and "regulation" is instructed to route 3. FIG. 8B illustrates an example of the contents of the regulation table TBL2 stored in the regulation route table memory unit 604 within the transmission line interface unit 501 which accommodates the transmission line $403_{BC}$ connected to the node $402_B$ and illustrates the present state that "pass" is instructed to route 2 and "regulation" is instructed to route 3 and route 4.

The operation of the thus arranged first embodiment of the present invention is described hereinafter with reference to the operation explanatory diagram of FIG. 9.

Figure 9:
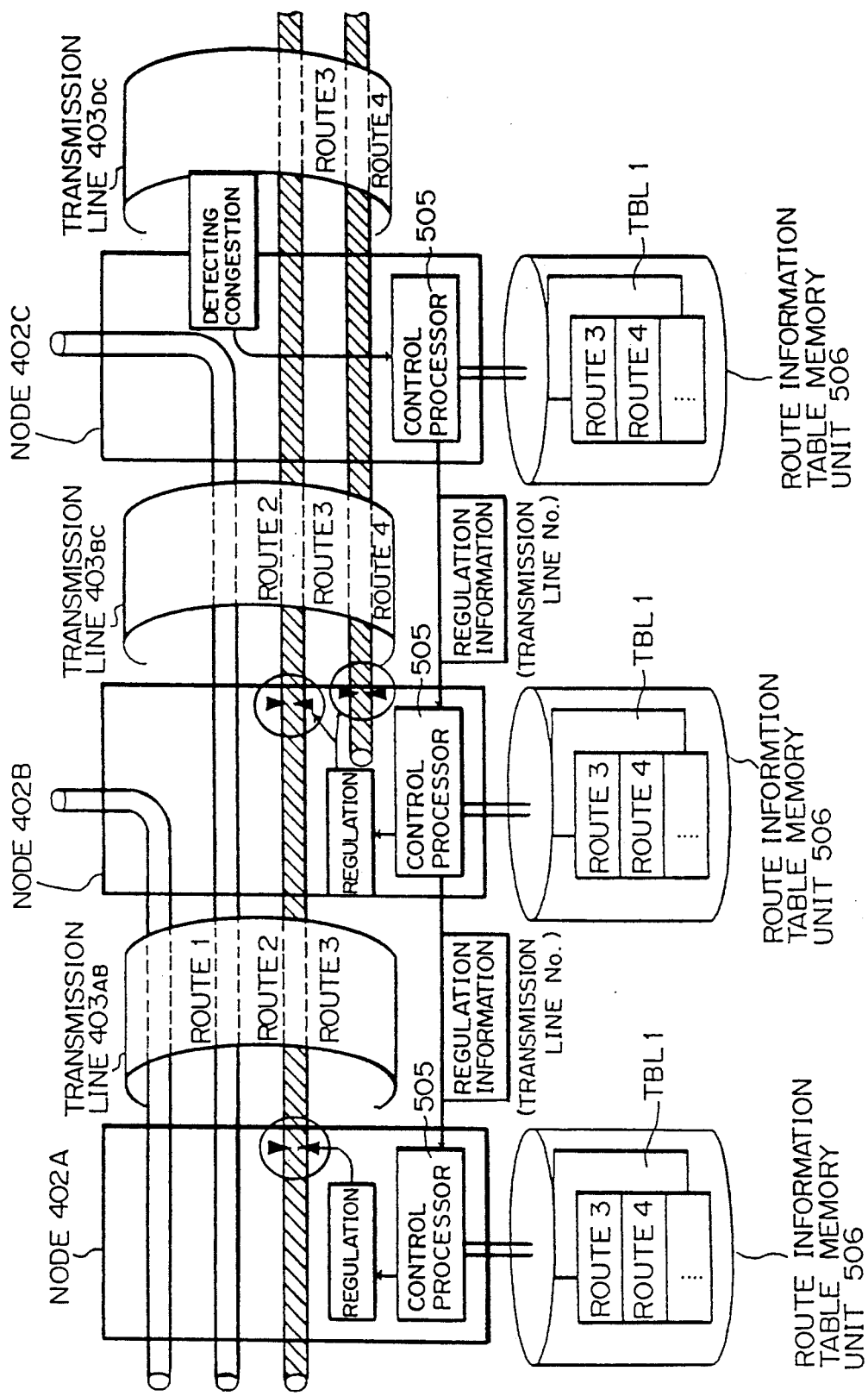
FIG. 9 is a schematic diagram used to explain a route regulating operation according to the first embodiment of the present invention.

As shown in the illustrated example of FIG. 9, in the packet communication network 401, a route formed of "node $402_A$, node $402_B$ and other node" is set as route 1; a route formed of "node $402_A$, node $402_B$, node $402_C$ and another node" is set as route 2; a route formed of "node $402_A$, node $402_B$, node $402_C$ and node $402_D$" is set as route 3; and a route formed of "node $402_B$, node $402_C$ and node $402_D$" is set as route 4.

FIG. 9 shows an example in which a congested state occurrs in the packet transmission unit of the transmission line accommodating unit 501 which accommodates transmission line $403_{DC}$ connected to node $402_C$.

Initially, when the stored amount supervisory unit 608 (FIG. 6) of the transmission line interface unit 501 which accommodates transmission line $403_{DC}$ detects that the number of packet data exceeds the predetermined value, a congested state (referred to as an overload hereinafter) is detected.

When this occurs, a congestion detected information is transmitted through the control bus 508 to the control processor 505 (see FIG. 5) of node $402_C$. Then, the control processor 505 allows the common channel signaling unit 507 to transmit regulation information indicating that the congestion occurred in transmission line $403_{DC}$ to the common channel. Thus, the regulation information is transmitted to all other nodes $402_A$, $402_B$ and $403_D$ to the packet communication network 401 of FIG. 4.

On the basis of this received regulation information, the control processor 505 (FIG. 5) of each node looks up the table corresponding to transmission line $403_{DC}$ of the route information table TBL1 stored in the route information table memory unit 506 of FIG. 5 to thereby extract information indicating route 3 and route 4, as shown in FIG. 7. Then, the control processor 505 determines on the basis of a call control table (not shown) or the like whether or not the route of the corresponding route number is involved in the transmission line accommodated within its own node. If the route involved in the transmission line accommodated within its own node exists, then the control processor 505 raises the flag "1" indicating "regulation" in the address corresponding to the above-mentioned route of the regulation route table memory unit 604 (see FIG. 6) within the transmission line interface unit 501 accommodating the transmission line 403 via the control bus 508.

In the illustrated example of FIG. 9, when the control processor 505 of node $402_B$ receives the regulation information concerning transmission line $403_{DC}$ from node $402_C$, the control processor 506 extracts route 3 and route 4 from the route information table TBL1 as shown in FIG. 9. Having determined that routes 3 and 4 are included in its own node, the control processor 505 raises the flag "1" indicating "regulation" in the addresses corresponding to routes 3 and 4 of the regulation route table TBL2 stored in the regulation route table memory unit 604 within the transmission line interface unit 501 accommodating the transmission line $403_{BC}$ which includes routes 3 and 4, as shown in FIG. 8B. Then, having detected that route 3 is included in its own node, the control processor 505 raises the flag "1" indicating "regulation" in the address corresponding to route 3 of the regulation route table TBL2 stored in the regulation route memory unit 604 provided within the transmission line interface unit 501 accommodating the transmission line $403_{AB}$ which includes route 3, as shown in FIG. 8A.

By using the regulation route table TBL2, the following regulation operation is carried out by each transmission line interface unit 501 of FIG. 6. In this embodiment, as shown in FIG. 10, the packet data transferred on the transmission line is composed of an information field in which communication data is stored, a header in which address information is stored and a route number region in which route number 611 indicating the route through which packet data is transmitted is stored. This route number region may be included in the header.

In the route number extracting unit 602 (FIG. 6) provided within the transmission line interface unit 501 which accommodates transmission line $403_{BC}$ connected to node $402_B$, the route number 611 stored in the route number region of the packet data input to the input and output unit 601 (FIG. 6) from the packet highway 506 through the distribution unit 504 (FIG. 5) is extracted. If this extracted route number 611 indicates, for example, route 2, the regulation route flag 612 of "0" indicating "pass" is output to the selector 605 (see FIG. 8B). Thus, the selector 605 connects the corresponding packet data to the pass route queue of the pass route queue buffer 607. However, the gate control unit 609 generally controls the gate 610 so as to select the output of the pass route queue buffer 607, as earlier noted. Therefore, the packet data indicating route 2 is normally transferred via transmission line $403_{BC}$.

If, on the other hand, the route number 611 indicates, for example, route 3 or route 4, the regulation route flag 612 of "1" indicating "regulation" is output to the selector 605 (see FIG. 8B). Thus, the selector 605 connects the corresponding packet data to the regulation route queue of the regulation route queuing buffer 606. In that case, since the selector 605 normally permits the gate 610 to select the output of the pass route queuing buffer 607 as mentioned before, the packet data indicating route 3 or route 4 connected to the regulation route queue is not transmitted to transmission line 403, but is restricted in the node $402_B$ of FIG. 9 as shown by the arrow.

As in the case of node $402_B$, if the packet data is input from the input and output unit 601 (FIG. 6) to the transmission line interface unit 501 which accommodates transmission line $403_{AB}$ of node $402_A$ and the route number 611 extracted by the route number extracting unit 602 indicates, for example, route 1 or route 2, then the regulation route flag 612 of "0" indicating "pass" is output to the selector 605 (see FIG. 8A). Thus, the selector 605 connects the corresponding packet data to the pass route queue of the pass route queuing buffer 607, whereby packet data indicating routes 1 and 2 are normally transferred via transmission line 403AB.

If, on the other hand, the route number 611 indicates, for example, route 3, then the regulation route flag 612 of "1" indicating "regulation" is output to the selector 605 (see FIG. 8A). Thus, the selector 605 connects the corresponding packet data to the regulation route queue of the regulation route queuing buffer 606, whereby the packet data indicating route 3 is not transmitted to transmission line $403_{AB}$ and the output is regulated as shown by the arrow of node $402_A$ of FIG. 9.

As a result of this operation, in the example of FIG. 9, the packet data of routes 3 and 4 flowed to transmission line $403_{DC}$ can be readily regulated and the regulation queuing buffer 606 of FIG. 6 can be prevented from being overflowed so that the congested state at the exit to transmission line $403_{DC}$ in node $402_C$ can be readily dissolved. In that case, in transmission lines $403_{AB}$ and $403_{BC}$, only the packet data of route 3 and route 4 passing through transmission line $403_{DC}$ are regulated. The packet data of route 1 and route 2 are not regulated, but are transferred in an ordinary fashion. Accordingly, the congested state in transmission line $403_{DC}$ can be suppressed from spreading to other transmission lines.

When the congested state in the pass route queuing buffer 607 of the transmission line interface unit 501 which accommodates transmission line $403_{DC}$ connected to node $402_C$ is dissolved owing to the above-mentioned regulation operation, the stored amount supervisory unit 613 within the transmission line interface unit 501 transmits information indicating that the congested state in transmission line $403_{DC}$ is dissolved through the control bus 508 to the control processor 505 (see FIG. 5). Subsequently, the control processor 505 transmits the same information indicating that the congested state in the transmission line $403_{DC}$ is cancelled through the common channel signaling unit 507 to the common channel 509.

As a consequence, this information is transmitted to all other nodes $402_A$, $402_B$ and $402_D$ of the packet communication network 401 of FIG. 4. When receiving this information, as in the case of the regulation operation, the control processor 505 of each node looks up the table corresponding to transmission line $403_{DC}$ of the route information table TBL1 stored in the route information table memory unit 506 of FIG. 5. The information indicating routes 3 and 4 is thereby extracted, as shown in FIG. 7. Then, the control processor 505 determines whether or not the route with the corresponding route number is included in its own node. If it is, the control processor 505 transmits congestion cancel information through the control bus 508 to the gate control unit 609 provided within the transmission line interface unit 501 accommodating transmission line 403, which includes that route.

Therefore, the gate control unit 609 permits the gate 610 to select the output of the regulation route queuing buffer 606 to thereby transmit the packet data connected to the regulation route queue of the regulation route queuing buffer 606 to the transmission line 403. Then, the gate control unit 609 permits the gate 610 to select the output of the pass route queuing buffer 607 again.

At the same time, the control processor 505 releases the flag "1" indicating "regulation" from the address corresponding to the route of the regulation route table memory unit 604 (see FIG. 6) provided within the above-mentioned transmission line interface unit 501, and raises the flag "0" indicating "pass" in this address.

According to this operation, the output regulations of the hatched portions of nodes $402_B$ and $402_A$ of FIG. 9 are cancelled.

Figure 1:
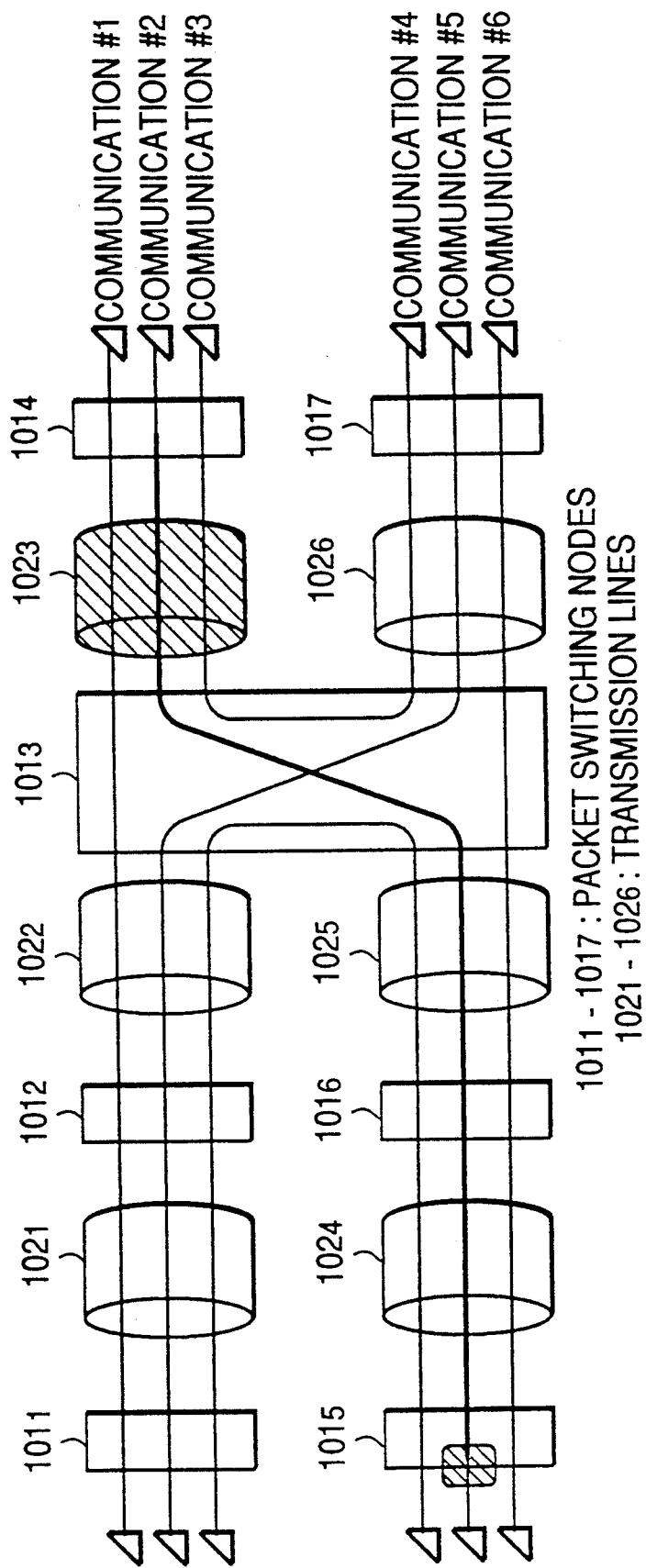
FIG. 1 is a conceptual diagram of an example of a direct regulation system according to the prior art.
Figure 2:
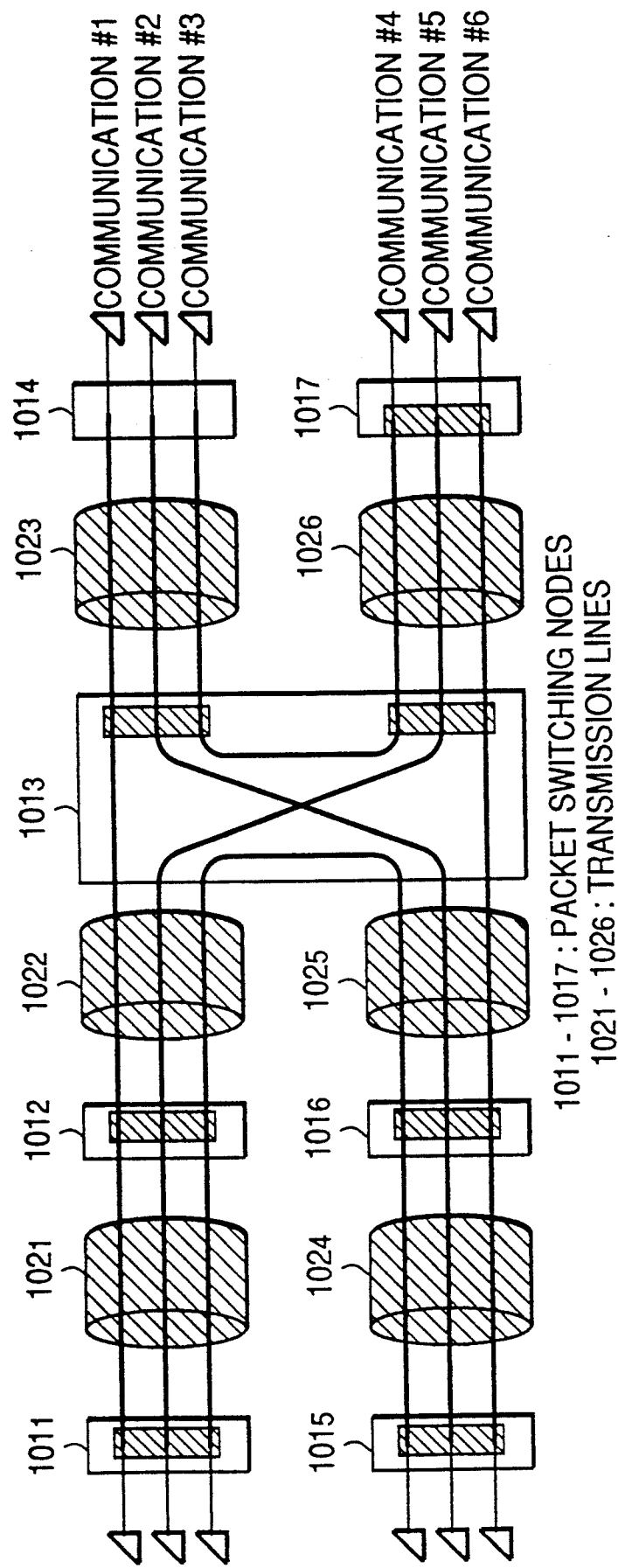
FIG. 2 is a conceptual diagram of an example of a transmission line regulation system according to the prior art.
Figure 11:
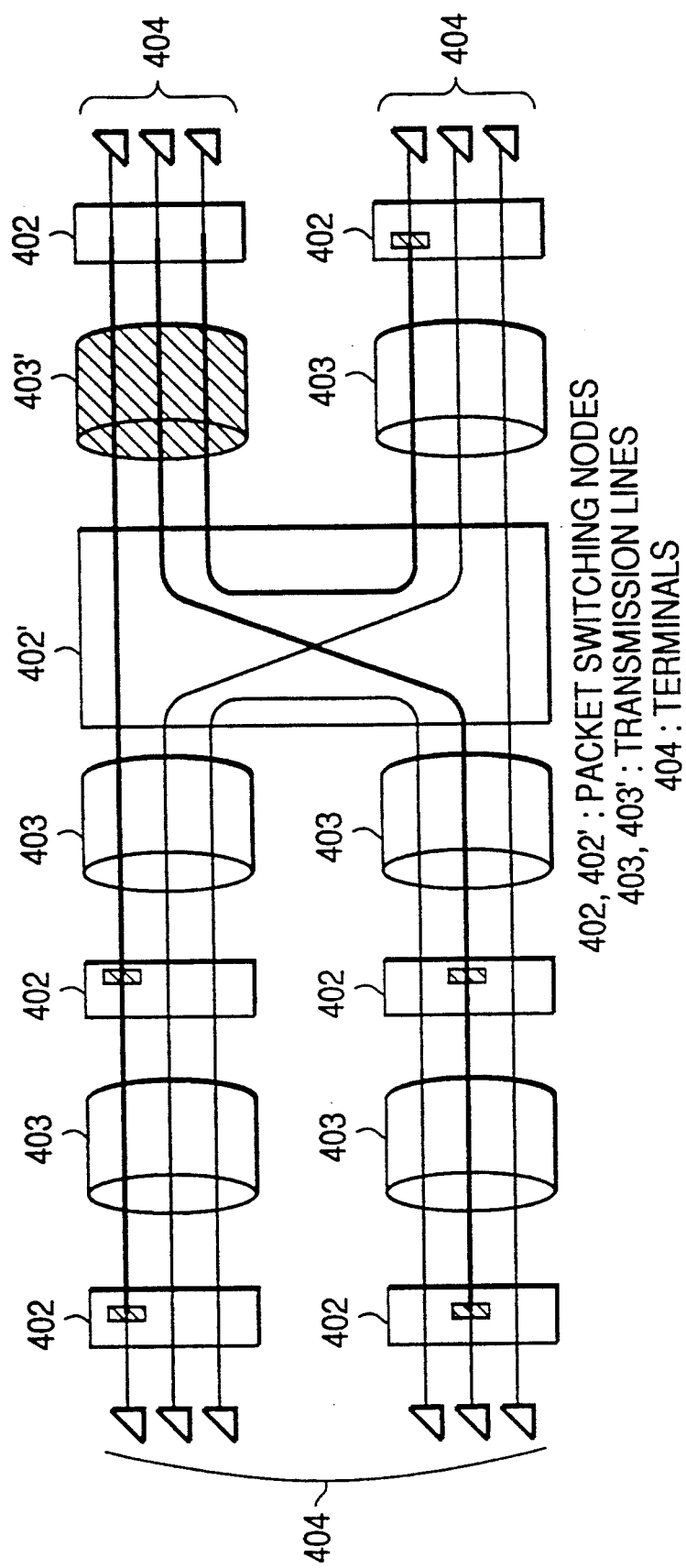
FIG. 11 is a conceptual diagram of a route identifying and regulating system according to the first embodiment of the present invention.

The first embodiment of the present invention is compared with the example of the prior art shown in FIG. 2 as follows. In the example of the prior art shown in FIG. 2, if the congested state occurs in the transmission line 403' including one node 402', all transmission lines concerning with communication lines including the node 402' are regulated as shown by the hatched portions of FIG. 2. There is then the possibility that the congestion state will spread to other nodes or other transmission lines. However, in the first embodiment of the present invention, as shown in FIG. 11, traffic passing through the transmission line is classified into "routes" and grouped, whereby congestion supervised objects can be limited to far fewer kinds of routes than in the prior art in which several hundreds to several thousands of individual communications must be supervised. Then, when a congested state occurs in the transmission line 403' accommodated within one node 402', only the route included in the transmission line 403' in which congestion occurs is regulated in the other transmission lines 403. As noted earlier, since "route" is defined by a combination of nodes and transmission lines between the sending node and the receiving node, only traffic passing through the congested transmission line can be regulated by the transfer regulation in which the route is limited. This can provided very efficient regulation. In addition, since the information necessary for regulation is limited to that of the transmission line 403' in which the congestion occurred, the amount of information necessary for regulation can be reduced, thus enabling efficient communication to be effected. Then, by using this information only, each node 402 can retrieve the route to be regulated at high speed and with ease only by looking up the route information table TBL1. Further, since the respective nodes independently perform the regulation operations in parallel, the regulation can be executed at high speed.

The second embodiment of the present invention is described next. This embodiment relates to the direct regulation system in which regulation information is directly transmitted to an input source of traffic which causes congestion.

In the second embodiment, the entire arrangement of the packet communication network, the block diagram of the packet-switching node and the arrangement of the route information table TBL1 are similar to those of the first embodiment of FIGS. 4, 5 and 7.

The arrangement of the transmission line interface unit 501 of FIG. 5 is different from that of the first embodiment in that the route number extracting unit 602, the regulation route table memory unit 604, the selector 605 and the regulation queuing buffer 606 shown in FIG. 6 are not provided. Thus, packet data input from the input and output unit 601 is directly connected to the pass route queue of the pass route queuing buffer 607.

Further, the format of packet data transmitted on the transmission line may be an ordinary one which does not need the route number region shown in FIG. 10.

An operation of the second embodiment is hereinafter described with reference to the operation explanatory diagram of FIG. 12.

Figure 12:
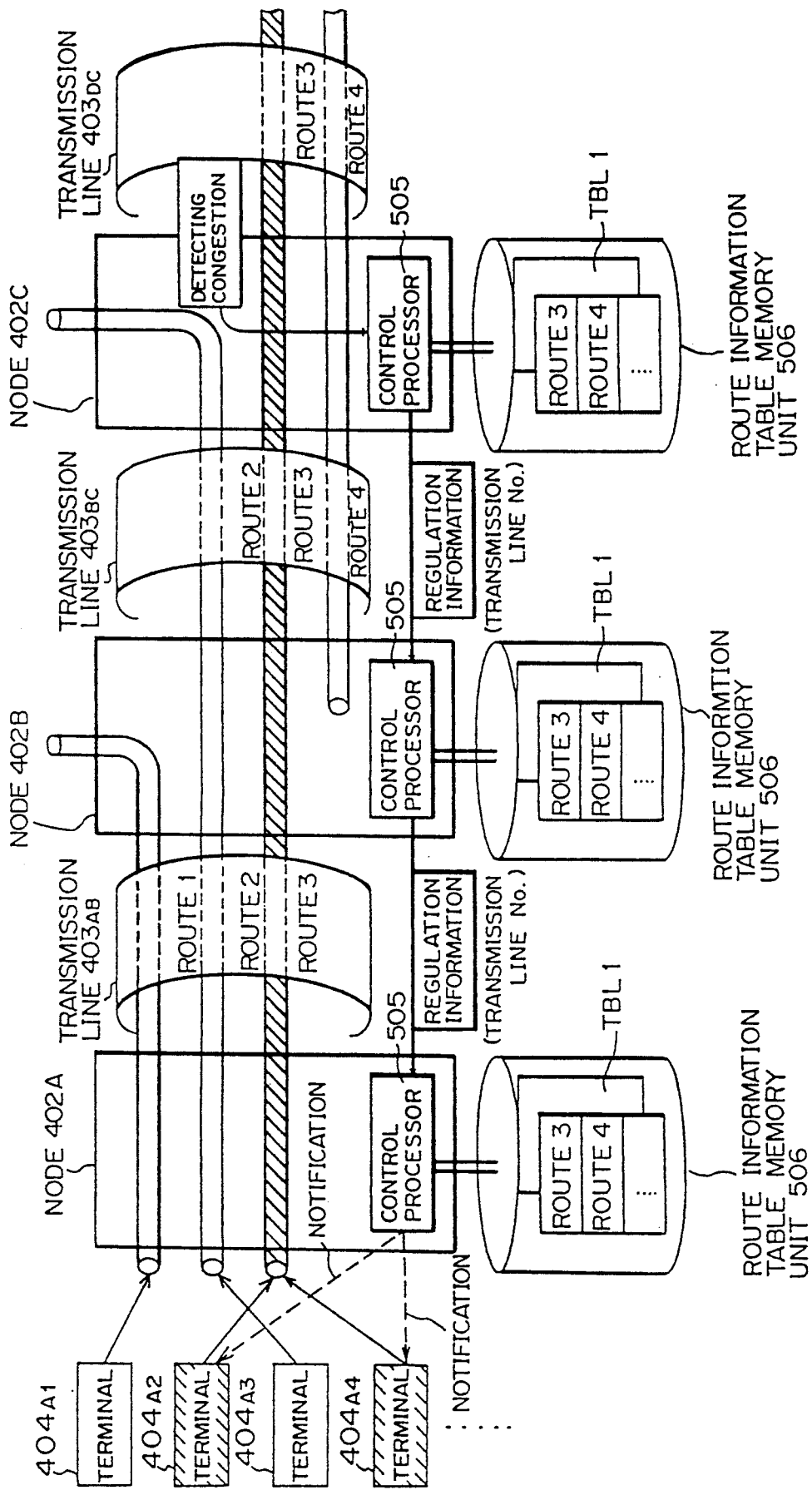
FIG. 12 is a schematic diagram for explaining the route regulating operation according to the second embodiment of the present invention.

As shown in the example of FIG. 12, routes similar to those of the first embodiment of FIG. 9 are set, and as in the case of FIG. 9, the congestion occurs in the packet transmission unit of the transmission line accommodating unit 501 which accommodates transmission line $403_{DC}$ connected to node $402_C$. When the stored amount supervisory unit 608 (see FIG. 6) of the transmission line interface unit 501 which accommodates the transmission line $403_{DC}$ detects that the number of packet data stored in the pass route queuing buffer 607 exceeds the predetermined value, the congestion state (overload) is detected.

When the congestion state is detected, as in the first embodiment of FIG. 9, the information of congestion detection is transmitted to the control processor 505 (see FIG. 5) of node $402_C$ through the control bus 508, and the control processor 505 transmits the regulation information indicating that congestion has occurred in transmission line $403_{DC}$ from the common channel signaling unit 507 to the common channel 509. Thus, the regulation information is issued or transmitted to nodes $402_A$, $402_B$ and $402_D$ accommodating the terminal 404 (see FIG. 4) of the packet communication network 401 of FIG. 4.

In that case, in the first embodiment of FIG. 9, the aforementioned route regulation operation is executed in each of nodes $402_B$ and $402_A$ on the basis of the route information table memory unit 506 of FIG. 5 and the regulation route table memory unit 604 of FIG. 6. In the second embodiment, only nodes $402_A$ and $402_B$ accommodating the terminal 404 (see FIG. 4) receive the regulation information concerning transmission line $403_{DC}$ from node $402_C$. Then, operations in which the respective control processor 505 of nodes $402_A$ and $402_B$ extracts route 3 and route 4 from the route information table TBL1 on the route information memory unit 506 (both seen in FIG. 5) as shown in FIG. 12 are similar to those of the first embodiment of FIG. 9.

In the second embodiment, un like in the first embodiment, the output regulation is not sequentially performed by the transmission line interface unit 501 of the output side of the upstream node.

Nodes $402_A$ and $402_B$ determine whether or not the terminals 404 using routes 3 and 4 are included in their own nodes. In that event, the respective nodes administer routes which are utilized by the terminals 404 accommodated by their own nodes, and such administration is performed as the ordinary control operation in the packet-switching node.

If it is determined that terminals $404_{A2}$ and $404_{A4}$, for example, utilize route 3 as shown by node $402_A$ in FIG. 12, then the control processor 505 of FIG. 5 executes the direct input regulation onto the packet assembly/disassembly unit 502 and terminals $404_{A2}$ and $404_{A4}$ connected thereto through the packet assembly/disassembly unit 502. This direct input regulation is realized by outputting a busy signal to, for example, terminals. The input regulation is not executed on a terminal which does not utilize its corresponding terminal.

According to the second embodiment, as in the first embodiment, the respective nodes need not grasp all communications concerning their own nodes, but may grasp only the state of the transmission line which is accommodated by the corresponding node via the stored amount supervisory unit 608 (see FIG. 6) corresponding to that transmission line, thereby effecting efficient transmission of regulation information by using only information of the transmission line. Then, each node can perform proper regulation control by utilizing the route information table TBL1 in units of "route". In addition, in the second embodiment, input regulation can be directly and effectively executed on the terminals which participate in the communication passing the congested transmission line.

The third embodiment of the present invention is described next. This embodiment relates to the direct regulation system in which direct regulation information is issued or transmitted to the input source, as in the second embodiment.

In the third embodiment, the overall arrangement of the packet communication network is similar to that of the first embodiment of FIG. 4, and the arrangement of the route information table TBL1 in the packet-switching node is similar to that of the first embodiment of FIG. 7. Furthermore, the arrangement of the transmission line interface unit 501 (see FIG. 5) is similar to that of the second embodiment, and in addition, the format of the packet transferred on the transmission line may be ordinary one and needs no route number region as shown in FIG. 10.

This embodiment includes as the arrangement of the packet-switching node a block arrangement shown in FIG. 13A in addition to the arrangement of FIG. 4. More specifically, in addition to the route information table memory unit 506, which is one of the specific features of the first embodiment, the third embodiment includes a route sending node number table memory unit 1301. Furthermore, a route sending node number table as shown in FIG. 13 is stored in this route sending node number table memory unit 1301. This route sending node number table can retrieve packet-switching nodes which become the starting points of the routes corresponding to the route numbers, i.e., sending node numbers nn, mm, ll, kk, . to #n accommodated within the transmission lines of its own node. This table is fixedly set when the circuit is set. In this embodiment, the following controls are executed by using this sending node number table.

Let us now consider the state of FIG. 12 which is similar to the state of the aforementioned second embodiment.

When congestion occurs in the packet transmission unit of the transmission line interface unit 501 which accommodates transmission line $403_{DC}$ connected to node 402$_C$, as in the first and second embodiment, the congestion detection information is transmitted to the control processor 505 (see FIG. 5) of node 402$_C$ through the control bus 508.

When receiving the congestion detection information, the control processor 505 looks up the sending node number table memory unit 1301 of FIG. 13A to retrieve the sending node numbers of routes 3 and 4 accommodated in transmission line 403$_{DC}$ in which the congestion occurs, from the sending node number table of FIG. 13B. Then, the control processor 505 transmits the regulation information indicating that congestion has occurred in transmission line 403$_{DC}$, to the packet-switching node of the retrieved sending number from the common channel signaling unit 507 through the common channel 509.

This operation, in the example of FIG. 12, causes the direct regulation information to be transmitted to node 402$_A$ which is the sending node for route 3. When receiving this regulation information, node 402$_A$ carries out exactly the same control operation as the second embodiment. More specifically, when the control processor 505 (FIG. 5) of node 402$_A$ receives the regulation information on transmission line 403$_{DC}$, it extracts route 3 from the route information table TBL1 on the route information table memory unit 506 of FIG. 5. Further, it determines on the basis of the inside administration information that, as shown, for example, in FIG. 12, route 3 is occupied by terminals 404$_{A2}$ and 404$_{A4}$. Thus, the control processor 505 executes the input regulation on the packet assembly/disassembly unit 502 and terminals 404$_{A2}$ and 404$_{A4}$ connected through the packet assembly/disassembly unit 502.

According to the third embodiment, as in the second embodiment, the input regulation is directly and effectively executed on the terminals which participate in the communication passing through the congested transmission line. In addition, the input regulation is readily extended onto only the sending node of the corresponding route, and the redundant regulation information packet can be prevented from being transferred to another node. Therefore, the regulation information can be executed efficiently and the congestion can be readily cancelled.

Finally, a fourth embodiment of the present invention will be described. One of the specific features of the fourth embodiment is that the supervision of the congested state at each node is carried out not only in the transmission line which accommodates the corresponding node but also in every route directly.

In the fourth embodiment, the overall arrangement of the packet communication network is similar to that of the first embodiment of FIG. 4. In the packet-switching node 402 of FIG. 4, the route information table memory unit 506 shown in FIG. 5 is not needed. Further, as in the third embodiment, when the regulation information is directly transmitted to the route sending node, the per-route sending node number table memory unit 1301 (see FIG. 13A) may be provided.

In the transmission line interface unit 501 of FIG. 5, when the output regulation is carried out by using the regulation route table TBL2, as in the first embodiment, the route number extracting unit 602, the regulation route table memory unit 604, the selector 605 and the regulation route queuing buffer 606 are provided as shown in FIG. 6. Conversely, when the output regulation is not carried out as shown in the second or third embodiment, these units are not provided.

Figure 14:
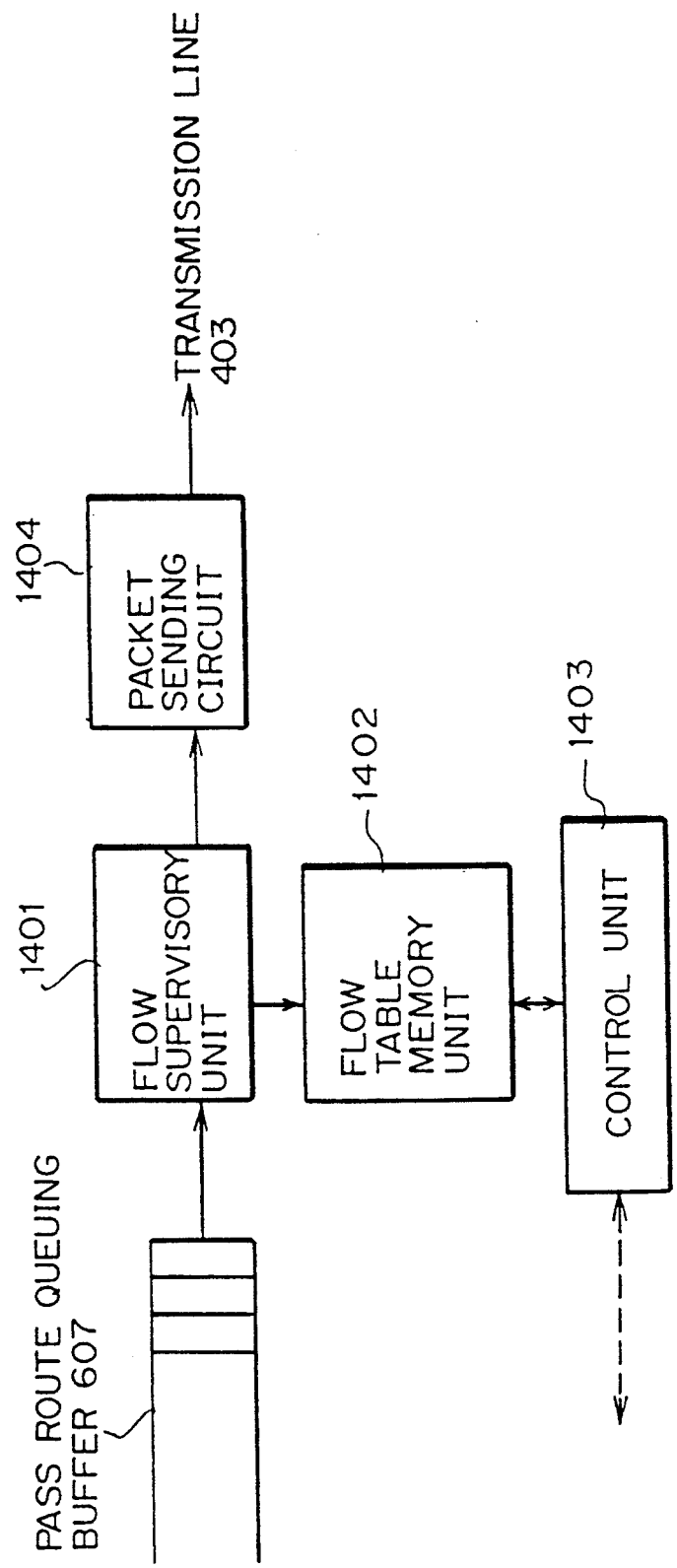
FIG. 14 is a schematic diagram of a transmission line interface unit to which the fourth embodiment of the present invention is applied.

Further, in the transmission line interface unit 501, a circuit block arrangement shown in FIG. 14 is additionally connected to the output side of the pass route queuing buffer 607 as the feature of the present embodiment.

In the thus arranged fourth embodiment, when the control processor 505 (FIG. 5) of each node receives information of a call setting (communication start of each communication) to a certain route from other node through the common channel signaling unit 507 from the common channel 509, the control processor 505 outputs an average traffic amount of routes included in the above-mentioned information through the control bus 508 to the transmission line interface unit 501 (see FIG. 5) which accommodates the transmission line corresponding to that route. This average traffic amount is determined on the basis of a user's statement when the call is set. The information of the average traffic amount is received by a control unit 1403 of FIG. 14 and stored in a flow table memory unit 1602 of FIG. 14, together with the route number.

A flow supervisory unit 1401 watches the flow of each route at the output unit of the pass route queuing buffer 607. To this end, the packet data transmitted on the transmission line is provided with the route number region in which the route number is stored, as in FIG. 10 of the first embodiment. Then, the flow supervisory unit 1401 extracts the route number from the route number region of the packet data output from the pass route queuing buffer 607 and supervises the flow of each route by counting the number of packet data at a predetermined time interval (e.g. 100 milliseconds) for every route identified by the route number.

Then, the control unit 1403 compares the flow of every route output from the flow supervisory unit 1401 with the average traffic amount of the route stored in the flow table memory unit 1402, and determines the occurrence of congestion when the flow exceeds the average traffic amount.

However, if the total traffic amount of the corresponding transmission line can be sufficiently accommodated within the capacity of the transmission line and if packets are not excessively stored in the pass route queue of the pass route queuing buffer 607, the control unit 1403 cannot determine whether or not congestion occurs this route. This judgment is executed when the control unit 1403 of FIG. 14 accesses the stored amount supervisory unit 608 of FIG. 6.

When congestion in a certain route is detected as described above, the control unit 1403 of FIG. 14 transmits the congestion detection information to the control processor 505 (see FIG. 5) via the control bus 508. Then, the control processor 505 transmits the regulation information indicating that congestion has occurred in the corresponding route to the common channel 509 from the common channel signaling unit 507. Thus, the regulation information is transmitted to another node 402 (see FIG. 4).

Since the regulation information is directly issued by using the route number as described above, the node, when receiving this regulation information, need not refer to the route information table TBL1 as shown in the first to third embodiments. Thereafter, as in the first embodiment, the output regulation may be carried out at the output side transmission line interface unit 501 by using the regulation route table TBL2 or the like. Alternatively, as in the second and third embodiments, the direct input regulation may be executed on the terminal which utilizes the regulation informed route by the terminal which is accommodated by its own node.

In the fourth embodiment described above, when the regulation information is transmitted, not the transmission line information in the first to third embodiments but the information concerning the route is directly transmitted. Accordingly, the information amount in the regulation information is greater than in the first to third embodiments in which the transmission line information is transmitted. However, since the number of routes is remarkably fewer than the number of individual communications as described before, the information amount can be considerably reduced compared with the prior art. Further, the node which receives the regulation information need not perform processing for judging the route from the information of the transmission line. Thus, the regulation control operation can be simplified compared with the first to third embodiments.

While the first to fourth embodiments are described as independent arrangements, if these respective arrangements are properly combined in response to the circumstances of the network, it is possible to realize an optimum regulation control.

Having described the preferred embodiments of the invention with reference to the accompanying drawings, it is to be understood that the invention is not limited to those precise embodiments and that various changes and modifications thereof may be effected by one skilled in the art without departing from the spirit or scope of the invention as defined in the appended claims.

What is claimed is:

1. A route regulating apparatus for regulating a packet in a packet communication network composed of transmission lines for connecting a plurality of terminals and packet-switching nodes which accommodate said plurality of terminals and said transmission lines for connecting said packet-switching nodes, comprising:
   a route which can be uniquely identified is defined by assigning an identifier to an arbitrary packet-switching node and an arbitrary transmission line in said packet communication network in an arbitrary order; and
   each of said packet-switching nodes including:
   route memory means for memorizing routes included in each of said transmission lines in said packet communication network;
   congestion state detecting means for detecting a congested state of an internal transmission line accommodated within a local packet-switching node;
   congested state informing means for transmitting a transmission line congested state detected by said congested state detecting means to another packet-switching node as congested state information;
   route identifying means for receiving said congested state information from said another packet-switching node and retrieving a retrieved route included in said transmission lines corresponding to said congested state information from said route memory means to thereby determine whether said retrieved route is to be accommodated within said local packet-switching node; and
   route control means for controlling a congested state of said retrieved route identified by said route identifying means on the basis of said congested state information.

2. The route regulating apparatus according to claim 1, wherein
   said congested state detecting means detects either an occurrence of a congested state or a cancellation of a congested state of the transmission line accommodated by its own packet-switching node;
   said congested state information is either congested state occurrence information indicating that a congested state has occurred in the transmission line accommodated within its own packet-switching node or congested state cancellation information indicating that said congested state occurring in the transmission line accommodated within its own packet-switching node is cancelled; and
   said route control means is for regulating transmission of packet data transferred through a route identified by said route identifying means when receiving said congested state occurrence information from the other packet-switching node and for cancelling a regulation in said route identified by said route identifying means when receiving said congested state cancellation information from the other packet-switching node.

3. The route regulating apparatus according to claim 2, further comprising transmission queuing buffer means for holding packet data to be transmitted to the transmission line at every transmission line accommodated within its own packet-switching node and regulation queuing buffer means for holding packet data whose transmission to its own transmission line is to be regulated, wherein
   said congested state detecting means is provided at every transmission line accommodated within its own packet-switching node and said congested state detecting means supervises an amount of packet data stored in said transmission queuing buffer means to thereby detect either the occurrence of said congestion state or the cancellation of said congestion state;
   said route control means is provided at every transmission route accommodated in its own packet-switching node;
   said route control means is comprised of:
   regulation route memory means for memorizing information indicating whether or not the transmission of packet data is presently regulated at every route involved in its own transmission line and when receiving said congestion state occurrence information from said other packet-switching node, and information indicating that the route identified by said route identifying means is regulated, while when receiving said congestion state cancelling information from said other packet-switching node and information indicating that said regulation to said route identified by said route identifying means is cancelled;
   route extracting means for extracting a route of packet data to be transmitted to its own transmission line;
   selector means for determining on the basis of said regulation route memory means whether or not said regulation is executed on said route extracted by said route extracting means, wherein when said regulation is executed, said selector means allows said regulation queuing buffer means to hold the packet data to be transmitted, and when said regulation is not executed, said selector means allows said transmission queuing buffer means to hold the packet data to be transmitted; and gate means for transmitting the packet data held in said regulation queuing buffer means to its own transmission line when receiving said congestion state cancelling information from said other packet-switching node and transmitting the packet data held in said transmission queuing buffer means to its own transmission line in other cases.

4. The route regulating apparatus according to claim 3, wherein a route number indicating a route through which said packet data is transmitted is added to said packet data and said route extracting means extracts the route of the packet data to be transmitted to its own packet by judging said route number added to said packet data.

5. The route regulating apparatus according to claim 3, wherein said route control means is provided at every transmission line interface units which accommodate respective transmission lines accommodated within its own packet-switching node.

6. A route regulating apparatus for regulating a packet in a packet communication network composed of transmission lines for connecting a plurality of terminals and packet-switching nodes which accommodate said plurality of terminals and said transmission lines for connecting packet-switching nodes with each other, where a route which can be uniquely identified is defined by assigning an identifier to an arbitrary packet-switching node and an arbitrary transmission line in said packet communication network in an arbitrary order; and each of said packet-switching nodes includes:

route memory means for memorizing routes included in each of said transmission lines in said packet communication network;

congested state detecting means for detecting a congested state of an internal transmission line accommodated within a local packet-switching node;

congested state informing means for transmitting a transmission line congested state detected by said congested state detecting means to another packet-switching node as congested state information;

route identifying means for receiving said congested state information from said another packet-switching node and retrieving a retrieved route included in said transmission lines corresponding to said congested state information from said route memory means to thereby determined whether said retrieved route is to be accommodated within said local packet-switching node; and route control means for determining whether a terminal utilizing the retrieved route identified by said route identifying means is accommodated within said local packet-switching node and performing input regulation of the packet data transmitted by said terminal or cancellation of said input regulation on the basis of said congested state information when said terminal is accommodated within said local packet-switching node.

7. A route regulating apparatus for regulating a packet in communication network composed of transmission lines for connecting a plurality of terminals and packet-switching nodes which accommodate said plurality of terminals and said transmission lines for connecting packet-switching nodes with each other, where a route which can be uniquely identified is defined by assigning an identifier to an arbitrary packet-switching node and an arbitrary transmission line in said packet communication network in an arbitrary order; and each of said packet-switching nodes includes:

route memory means for memorizing routes included in each of said transmission lines in said packet communication network;

per-route sending node identifying information memory means for storing identifying information of a sending packet-switching node which is a starting point of said route at every route involved in respective transmission lines accommodated within a local packet-switching node;

congested state detecting means for detecting a congested state of an internal transmission line accommodated within said local packet-switching node;

congested state informing means for searching said sending packet-switching node corresponding to said route included in said internal transmission line detected by said congested state detecting means by referring to said per-route sending node identifying information memory means transmitting a transmission line congested state detected by said congested state detecting means to another packet-switching node as congested state information;

route identifying means for receiving said congested state information from said another packet-switching node and retrieving a retrieved route included in said transmission lines corresponding to said congested state information from said route memory means to thereby determined whether said retrieved route is to be accommodated within said local packet-switching node; and route control means for determining whether a terminal utilizing the retrieved route identified by said route identifying means is accommodated within said local packet-switching node and performing input regulation of the packet data transmitted by said terminal or cancellation of said input regulation on the basis of said congested state information when said terminal is accommodated within said local packet-switching node.

8. The route regulating apparatus according to claim 7, wherein contents of said route memory means and said route sending node identifying information memory means are set in response to a layout of respective circuits used to construct said packet communication network.

9. A route regulating apparatus for regulating a packet in a packet communication network composed of transmission lines for connecting a plurality of terminals and packet-switching nodes which accommodate said plurality of terminals and said transmission lines for connecting packet-switching nodes with each other, where a route which can be uniquely identified is defined by assigning an identifier to an arbitrary packet-switching node and an arbitrary transmission line in said packet communication network in an arbitrary order; and each of said packet-switching nodes includes:

congested state detecting means for detecting a congested state of an internal transmission line accommodated within a local packet switching node;

congested state informing means for transmitting a transmission line congested state detected by said congested state detecting means to another packet-switching node as congested state information; and route control means for receiving said congested state information from said another packet-switching node and controlling said congested state of an internal route which is accommodated within said local packet-switching node corresponding to said congested state information.

10. The route regulating apparatus according to claim 9, wherein said congested state detecting means is comprised to flow supervising means for supervising a flow of packet data in a route accommodated within its own packet-switching node and detecting means for detecting a congested state of a route by comparing a flow supervised by said flow supervising means with a traffic amount set when a call setting in said route is performed.

11. The route regulating apparatus according to claim 10, wherein a route number indicating a used route through which said packet is transmitted is additionally provided in said packet data and said flow supervising means determines said route number included in the packet data in said internal transmission line which is accommodated within said local packet-switching node and supervises flow of said packet data in said used route identified by said route number by counting a number of said packet data at predetermined time intervals.

* * * * *